Feb. 13, 1945.   L. DREYFUS   2,369,287
ELECTRIC HIGH FREQUENCY GENERATOR
Filed Dec. 2, 1941
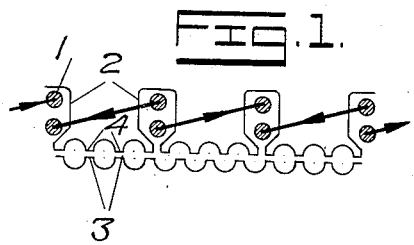
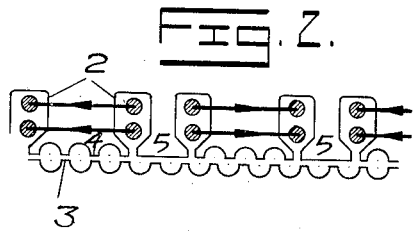
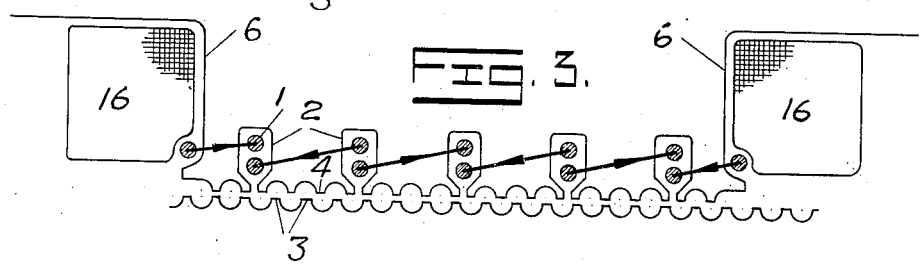
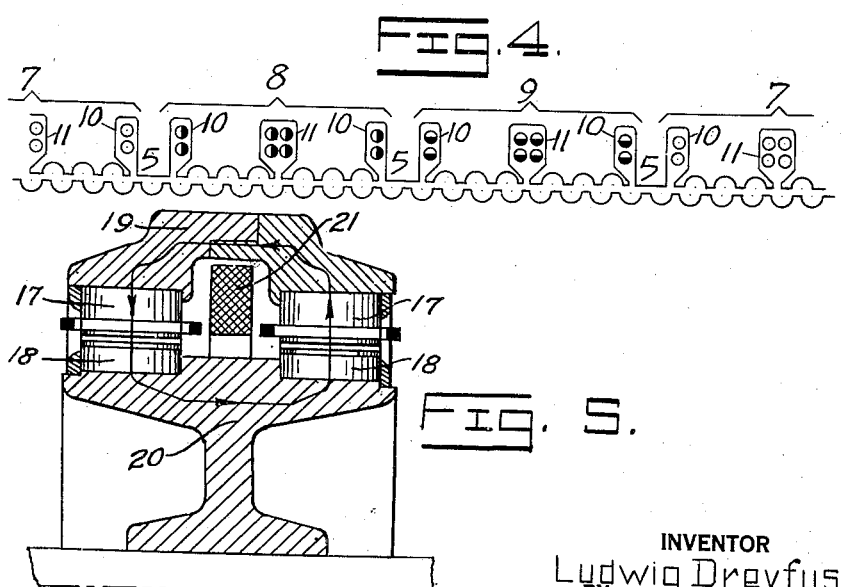
INVENTOR
Ludwig Dreyfus
BY
ATTORNEY Patented Feb. 13, 1945

2,369,287

UNITED STATES PATENT OFFICE 2,369,287

ELECTRIC HIGH-FREQUENCY GENERATOR

Ludwig Dreyfus, Vasteras, Sweden, assignor to Allmänna Svenska Elektriska Aktiebolaget, Vasteras, Sweden, a Swedish corporation Application December 2, 1941, Serial No. 421,311
In Sweden December 9, 1940

7 Claims. (Cl. 171—252)

For obtaining a considerably higher frequency in alternating current generators than that corresponding to the product of pole number and number of revolutions, it has been proposed to provide the magnet cores of the stator and the rotor with teeth without individual windings, which teeth are opposed to each other on certain portions of the periphery and alternate with each other at other portions of the periphery at the same time. At the former portions, the reluctance in the air gap will be a minimum and the air gap flux therefore a maximum, while at the latter portions the conditions will be opposite, and the transition from one state to the other upon rotation of the rotor takes place at a frequency obtained by dividing the peripheral speed by the linear tooth pitch. By placing suitable windings on one of the magnetic cores, it is therefore possible to generate an E. M. F. of very high frequency. The types of such machines which have hitherto been described have, however, been very badly utilized, as it has not been realized how the inducing winding (exciting or D. C. winding) should be arranged with respect to the induced winding (working or A. C. winding) and to the magnet cores in order to achieve the best possible result. Thus, these windings have either been arranged to embrace about equal portions of the periphery and only in different axes, or certain portions of the periphery have been left unwound as return paths for the magnetic flux.

According to the present invention the arrangement is such that each toothed portion of the wound core, which has a uniform position of the teeth with respect to the other core and thus is magnetically uniform, is confined on both sides between parts of the induced winding. If the machine has alternating polarities along its periphery, the induced winding preferably contains a comparatively large number (at least four) of such magnetically uniform portions for each pole and phase, whereby the flux variation in the yoke will be small as compared with the total flux of a pole.

Various forms of the invention are illustrated in the drawing in which,

Fig. 1 is a diagram illustrating the basic characteristics of the invention;

Fig. 2 is a diagram showing a modification of the invention;

Fig. 3 is a diagram of another form of the invention;

Fig. 4 diagrammatically illustrates still another modification, and,

Fig. 5 shows a further modification.

In all the figures, the rotor has an entirely uniform tooth pitch. The smallest possible value of this pitch in practice depends on the air gap which is in its turn determined by mechanical reasons. An examination of the magnetic conditions shows that the linear tooth pitch should preferably be not smaller than six times the air gap between the crowns of the teeth. This condition gives a proportion between the maximum and minimum reluctance in the air gap which is about 1.3, and this proportion is rapidly reduced if the ratio of tooth pitch to air gap is reduced below 6. As the air gap between the crowns of the teeth should be at least .5 millimeter in medium size machines for mechanical reasons, the minimum value of the tooth pitch will be 3 millimeters, which for a peripheral speed of 100 meters per second gives about 33,000 cycles. In practice, the lower limit of the pitch is usually somewhat larger, for instance 4–5 millimeters.

In Fig. 1, the working winding 1 is a coil winding having one coil embracing each section between the slots 2, and the wound part (in the following simply referred to as the stator, as it is generally stationary for practical reasons) has its teeth displaced one half tooth pitch from one slot pitch to the next, while the pitch of the rotor teeth 3 is uniform, so that the flux traversing one coil has its maximum at the same time as the flux traversing the next coil has its minimum. The induced E. M. F. will therefore be alternatively in opposite directions in the coil, as indicated by the arrows, and this has to be observed in connecting the coils together. Each toothed portion of the stator will in this manner be fully utilized, as its flux varies uniformly from a maximum to a minimum, and as it is confined on both sides between conductors in which a corresponding E. M. F. is induced. This of course also holds good if the coil winding illustrated is replaced, in a manner well-known per se, by a wave winding which forms only one closed coil for the whole machine or for a larger portion thereof, for instance a pole pitch.

It should be noted that the alternating current voltage generated in the machine will be substantially independent of the number of slots, as a reduction of this number will cause each slot pitch to embrace an increased flux which varies in the same proportion and thus induces a proportionally higher voltage in the coil with the same number of conductors therein. In practice, the linear coil pitch in the stator is limited in accordance with the flux variation in the yoke and to the iron losses caused thereby. The flux in the yoke will be constant in substance, and its variations will only depend on the removal of the higher or lower reluctance from one coil pitch to the next one. If the coil pitch is increased, the flux variations in the yoke will also increase and cause higher iron losses. On the other hand, the leakage reactance and the short circuit losses are reduced by an increase of the coil pitch, and therefore there is a proportion between stator coil pitch and rotor tooth pitch which gives a minimum of total losses. For a very small tooth pitch and for a uniform slot pitch, in which case the said proportion should be an entire number + one half, an appropriate value has proved to be 5½. The condition may also be thus expressed that the ratio between stator slot pitch and rotor tooth pitch should be $$\frac{2n+1}{2}$$

where $n$ is an entire number not exceeding 8. Each stator slot pitch should preferably begin and end with a tooth, that is, embrace $n+1$ teeth and $n$ intermediary grooves. The stator slots should, as shown, be semi-closed, the width of the split open towards the air gap corresponding to half of the difference between the widths of the groove and the tooth. In this way, the greatest possible difference is obtained between maximum and minimum flux in a slot pitch.

In Fig. 2, the stator slots are arranged in spaced pairs with the intermediary iron alternatively active on the adjacent portions embraced by conductors, and inactive on the intermediate portions 5 which are limited in narrowness only by the requirements of mechanical strength. The inactive portions 5 have no teeth 4 adjacent to the air gap.

The magnetic flux may have the same direction along the whole periphery, in which case the machine is preferably composed, in a manner known per se, of two stator cores and two rotor cores of equal diameters which are magnetically connected together so as to form a closed magnetic circuit around the circular exciting winding. In this magnetic circuit, the magnetic flux will thus be directed outwards in one air gap and inwards in the other. Such a form is shown in Fig. 5, wherein the two stator cores are shown at 17, 17 and two rotor cores are indicated at 18, 18. The stator contains a yoke 19, and the rotor a yoke 20 forming, together with the cores, a closed magnetic circuit around the circular exciting winding 21. The curved line with arrows shows the circulating magnetic flux. It is also possible to use a single pair of cores and cause the flux to be directed outwards on one or more portions of the periphery and inwards on the remaining portion or portions, as is common in bi- or multipolar machines. Such a form is shown in Fig. 3 which, however, only shows one such portion having constant flux direction (pole arc) including the large stator slots 6 limiting said arc and containing the exciting winding 16. For better utilizing the stator iron, a couple of conductors belonging to the induced stator winding 1 are also placed in the slots 6.

In order to prevent the induced winding from inducing a high-frequency voltage in the exciting winding (high-frequency armature reaction), each portion of the periphery embraced by a magnetizing winding (each pole arc) preferably contains an odd number of slots 2 for the induced winding 1, for instance five slots, and magnetic portions of half the normal width are arranged adjacent to the slots 6, as shown in Fig. 3. It is seen from the figure, in which the current directions in the induced winding at a certain instant are marked by arrows, that these currents produce no resultant alternating flux through the winding 16 contained in the slots 6, but the high-frequency fluxes form locally closed circuits within the pole arc.

If it is desired to provide the machine with a polyphase winding, this can be done for instance according to Fig. 4. The coils belonging to the different phases here embrace entirely different zones 7, 8, 9 of the periphery of the stator, and in each zone the stator teeth are displaced by a third of a tooth pitch with respect to the adjacent zones. In machines having uniform flux direction along the whole periphery, each such zone may embrace $1/n$ of the periphery or a fraction thereof, if $n$ is the number of phases. With respect to insulation, it may then be inappropriate to place coil sides belonging to different phases in the same slot, and therefore short inactive portions 5 of the stator core are arranged between the zones belonging to different phases in a manner corresponding to Fig. 2. The slots 10 embracing these inactive portions only contain one coil side each, while the slots 11 lying inside a phase zone contain two coil sides belonging to the same phase.

A polyphase machine having alternating flux direction along the periphery may also be so arranged that each pole arc embraced by an exciting winding only contains stator teeth and winding coils belonging to one phase, in which case the pole number of the exciting winding should be equal to the phase number or a multiple thereof. At least for the minimum number of poles there is, however, a certain risk of dissymmetry between the phases if the rotor is not exactly centered.

I claim as my invention:

1. An electric high frequency generator comprising a stator and a rotor part both having teeth without individual windings, one of said parts having a uniform tooth pitch and the other having a plurality of portions, said portions each having a set of teeth of a uniform pitch corresponding to the pitch of the teeth on the other part, the sets of teeth on the different portions being alternatively displaced so that when the sets of teeth on certain of said portions are in registry with the teeth on the other part, the sets of teeth on certain other portions are out of registry with the teeth on the other part, whereby to afford maximum and minimum reluctance in the air gap, alternating current winding parts embracing certain of said portions, and an exciting winding embracing pole arcs of alternatively directed flux, each of which arcs embraces at least four of said portions.

2. An electric high frequency generator comprising a stator and a rotor part both having teeth without individual windings, one of said parts having a uniform tooth pitch and the other having a plurality of portions, said portions each having a set of teeth of a uniform pitch corresponding to the pitch of the teeth on the other part, the sets of teeth on the different portions being alternatively displaced so that when the sets of teeth on certain of said portions are in registry with the teeth on the other part, the sets of teeth on certain other of said portions are out of registry with the teeth on the other part, whereby to afford maximum and minimum reluctance in the air gap, semi-closed slots confining said portions and alternating current conductors contained in each of said slots.

3. An electric high frequency generator comprising a stator and a rotor part both having teeth without individual windings, one of said parts having a uniform tooth pitch and the other having a plurality of portions, said portions each having a set of teeth of a uniform pitch corresponding to the pitch of the teeth on the other part, the pitch of the different portions being $$\frac{2n+1}{2}$$

times the tooth pitch, where $n$ is an entire number not exceeding 8, the sets of teeth on said portions being alternatively displaced so that when the sets of teeth on certain of said portions are in registry with the teeth on the other part, the sets of teeth on certain other of said portions are out of registry with the teeth on the other part, whereby to afford maximum and minimum reluctance in the air gap, and alternating current winding parts confining each of said portions.

4. An electric high frequency generator comprising a stator and a rotor part both having teeth without individual windings, one of said parts having a uniform tooth pitch and the other having a plurality of portions, said portions having a set of teeth of a uniform pitch corresponding to the pitch of the teeth on the other part, the different portions comprising $n+1$ teeth and $n$ intermediary grooves, where $n$ is an entire number not exceeding 8, the sets of teeth on said portions being alternatively displaced so that when the sets of teeth on certain of said portions are in registry with the teeth on the other part, the sets of teeth on certain other of said portions are out of registry with the teeth on the other part, whereby to afford maximum and minimum reluctance in the air gap, and alternating current winding parts confining said portions.

5. An electric high frequency generator comprising a stator and a rotor part both having teeth without individual windings, one of said parts having a uniform tooth pitch and the other having a plurality of portions, said portions each having a set of teeth of a uniform pitch corresponding to the pitch of the teeth on the other part, the sets of teeth on the different portions being alternatively displaced so that when the sets of teeth on certain of said portions are in registry with the teeth on the other part, the sets of teeth on certain other of said portions are out of registry with the teeth on the other part, whereby to afford maximum and minimum reluctance in the air gap, alternating current winding parts embracing said portions and an exciting winding embracing pole arcs of alternatively directed flux, each of which arcs embraces a plurality of said portions, the tooth portions at the ends of such pole arcs being of only half the normal width.

6. A polyphase electric high frequency generator comprising a stator and a rotor part both having teeth without individual windings, one of said parts having a uniform tooth pitch and the other having a plurality of portions, said portions each having a set of teeth of uniform pitch corresponding to the pitch of the teeth on the other part, the sets of teeth on the different portions being alternatively displaced by a fraction of a tooth pitch corresponding to the phase number so that when the sets of teeth on certain of said portions are in registry with the teeth on the other part, the sets of teeth on certain other of said portions are out of registry with the teeth on the other part, whereby to afford maximum and minimum reluctance in the air gap in different phases, said portions being repeated for each phase within each section of the periphery having unidirectional flux in the air gap, and alternating current winding parts confining said portions.

7. A polyphase electric high frequency generator comprising a stator and a rotor part both having teeth without individual windings, one of. said parts having a uniform tooth pitch and the other having a plurality of portions, each having a set of teeth of uniform pitch corresponding to the pitch of the teeth on the other part, the sets of teeth on the different portions being alternatively displaced by a fraction of a tooth pitch corresponding to the phase number so that when the sets of teeth on certain of said portions are in registry with the teeth on the other part, the sets of teeth on certain other of said portions are out of registry with the teeth on the other part, whereby to afford maximum and minimum reluctance in the air gap in different phases, alternating current winding parts confining said portions and an exciting winding embracing pole arcs of alternatively directed flux each containing sets of teeth so confined by said alternating current winding parts as to correspond to only one phase of induced voltage.

LUDWIG DREYFUS.